TELEPHONE SYSTEM

Filed Dec. 26, 1956 4 Sheets-Sheet 1

INVENTOR.
CLARENCE E. LOMAX

BY
C. A. Gulbrandsen
ATTY.

Nov. 3, 1959 C. E. LOMAX 2,911,478

TELEPHONE SYSTEM

Filed Dec. 26, 1956 4 Sheets-Sheet 2

INVENTOR.
CLARENCE E. LOMAX
BY
C. A. Gulbrandsen
ATTY.

LINE CIRCUIT 300

INVENTOR.
CLARENCE E. LOMAX
BY
C. A. Gulbrandsen
ATTY.

TELEPHONE SYSTEM

Filed Dec. 26, 1956 4 Sheets-Sheet 4

INVENTOR.
CLARENCE E. LOMAX
BY
C. A. Gulbrandsen
ATTY.

United States Patent Office 2,911,478

Patented Nov. 3, 1959

2,911,478

TELEPHONE SYSTEM

Clarence E. Lomax, Chicago, Ill., assignor to General Telephone Laboratories, Incorporated, a corporation of Delaware Application December 26, 1956, Serial No. 630,541

16 Claims. (Cl. 179—18)

This invention relates in general to telephone systems, but is more particularly concerned with systems relating to main, or parent exchanges of a system and wherein the main exchange has a smaller, or sub exchange subsidiary thereto.

It is a main object of the invention to provide improved switching apparatus and novel circuit arrangements in both the main and sub exchanges to reduce the cost as well as improve the services in such a system while maintaining the services in a reliable and efficient manner.

In this system, other objects relate to the provision of novel switching equipment at the main exchange for completing local calls, calls to Private Branch Exchanges (PBX's), calls to sub exchanges, or Private Automatic Branch Exchanges (PABX's) and calls to subscribers desiring special services. This switching equipment is also arranged to receive calls from the PABX and then extend and complete them to local subscribers of the main exchange, the PBX's, or to the subscribers desiring the special services. Only the subscribers desiring the special services are equipped with new and novel line circuits, which effectively provide these special services.

Still further objects relate to the provision of novel switching equipment at the sub exchange for completing local calls, calls to an attendant's cabinet, calls to the main exchange and means for discriminating between restricted and non-restricted subscribers. This switching equipment is also arranged to receive calls from the main exchange and extend and complete them either locally or to the attendant's cabinet.

A feature of the invention relates to an improved combination of means in the system, whereby the above-mentioned objects are effectively accomplished.

Another feature of the invention relates to an improved connector in the main exchange and including means whereby extremely fast rotary action of the connector is provided for selecting an idle trunk in a PBX trunk group.

Another feature of the invention relates to an improved subscriber line circuit in the main exchange and including means whereby the subscriber is given a special "wanted" tone if his line is busy at the time that he is called by another party.

Still another feature of the invention relates to a combination of the improved connector and improved line circuit, whereby means is provided to automatically connect a calling line to a second set of connector terminals leading to the line circuit and "camp" thereon, in the event that the called line equipped with the improved line circuit is called and is busy.

A further feature of the invention relates to means in the improved line circuit for connecting the camping line with the called line by way of the above-mentioned second set of connector terminals at the time that the called line becomes idle.

Still another feature of the invention relates to means whereby the calling line receives ring-back tone and does not receive busy tone in the event that the called line having the improved line circuit is called and the first set of connector terminals leading to the called line are busy, while the second set of contacts are not busy. However, means is provided whereby a subsequent calling line receives busy tone upon finding the first set of connector terminals busy and the previously mentioned calling line "camping" on the second set of connector terminals.

Another feature of the invention relates to the improved connector in the sub exchange including a testing means and switching means used only when the connector is extending local calls and a different testing means and switching means used only when the connector is extending a connection to the central office or attendant's cabinet trunks.

A further feature of the invention relates to the improved connector in the sub exchange and including means for discriminating as to the type of calling line, thereby determining the service to be provided for the calling line.

An additional feature of the invention relates to the improved connector in the sub exchange and means whereby a signal is transmitted to the calling line, in the event that the calling line is limited restricted service and has attempted to initiate a call of the type that the calling line is not entitled to.

Another feature of the invention relates to the improved connector in the sub exchange and including means whereby the connector is effective to function as an automatic trunk hunting connector on two levels by operating in conjunction with a particular test relay and switching relay and is effective to function as a directively controlled connector on the remaining levels by operating in conjunction with a different test relay and a different switching relay.

Still another feature of the invention relates to the improved connector at the sub exchange and including means whereby on local calls the busy test relay is used to provide talking battery for the called party.

A still further feature of the invention relates to the improved connector at the sub exchange and including means whereby an extra control conductor is grounded or not, depending on whether a restricted or non-restricted line is calling, for enabling the connector to determine if the calling line is entitled to the type of call that is being initiated.

These and other objects and features of the invention will become apparent upon a further perusal of the specification and claims taken in conjunction with the accompanying drawings comprising Figs. 1–4, inclusive, which show by means of the usual diagrams a sufficient amount of the apparatus to enable the invention to be described and understood and in which:

GENERAL DESCRIPTION

Figure 1:
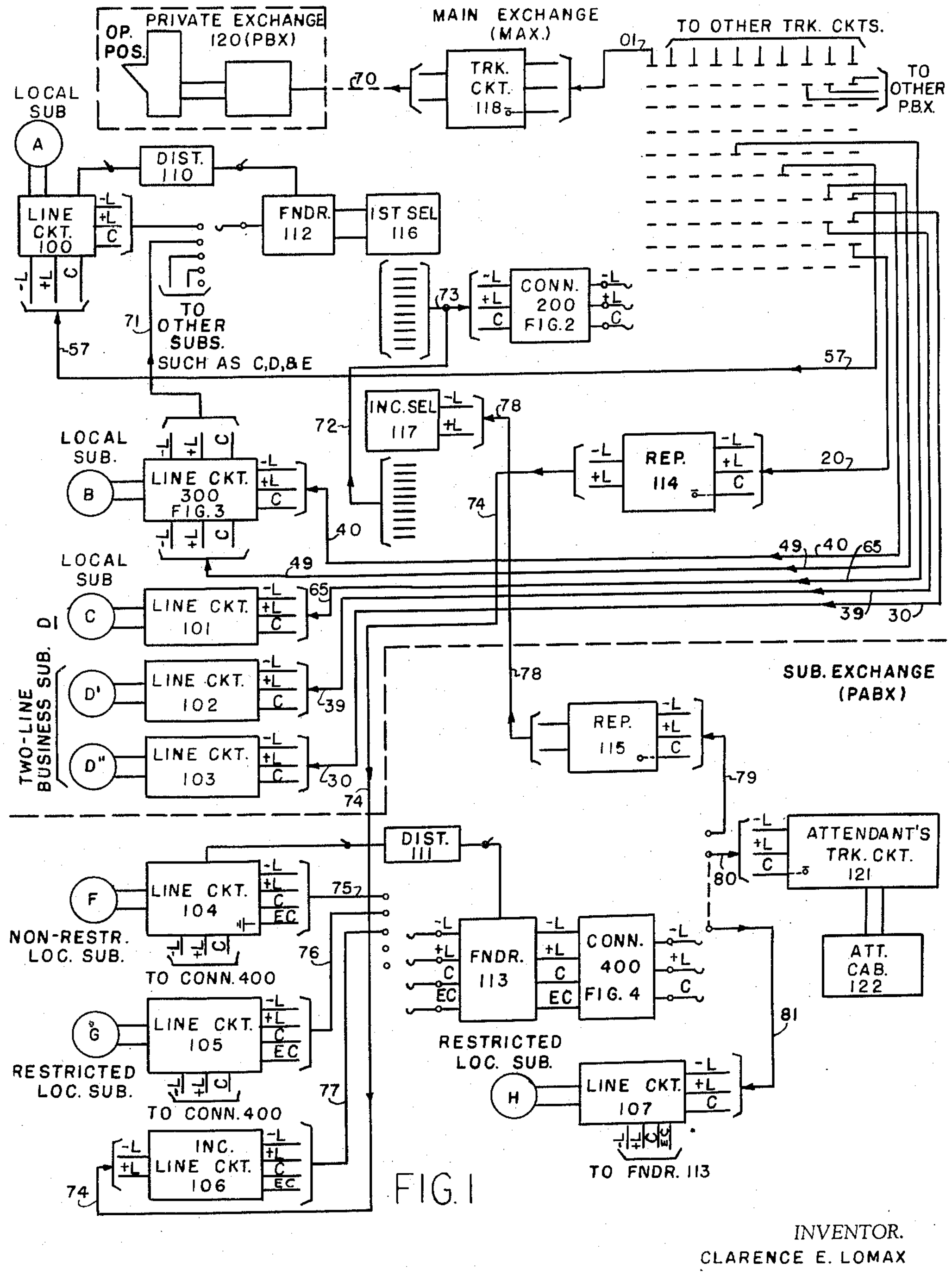
Fig. 1 shows in schematic form the trunking diagram of a typical telephone system utilizing the improved circuit arrangements of the present invention as applied to the system in a main exchange and a sub exchange.

The telephone system utilizing the present invention is shown as being comprised essentially of a main exchange and sub exchange. Reference will now be had with Fig. 1 in particular wherein it will be found that:

The main exchange, in addition to disclosing the improved connector switch 200 and improved special service line circuit 300, discloses an efficient arrangement of standard and universal well-known components such as the regular line circuits 100—103, distributor 110, finder-selector link comprising finder 112 and first selector 116, trunk circuit 118, repeater 114, PBX 120, and incoming selector 117. Connected to these regular line circuits 100—103 are the local subscribers such as A and C and the two-line business subscriber D comprising first and second substations D′ and D″, respectively, while the special service line circuit 300 is connected to local subscriber B, who desires to be provided with the special services of receiving a "wanted" tone when his line is called and found busy and also having these "wanted" tone calls metered. At the same time, this special service line circuit 300 in conjunction with the improved connector 200 also provides a camping service for the calling line at the time that the "wanted" tone is transmitted to the called local subscriber B.

The improved connector 200 at the main exchange is shown as being connected to the bank of first selector 116 of the finder-selector link while trunk circuits such as 118, corresponding to the various sized PBX trunk groups, are connected to certain levels in the bank of connector 200. A repeater 114 is shown as being connected to the bank of connector 200 for providing means to extend a call from the main exchange to the sub exchange, or PABX. The two-line business subscriber D and the local subscriber B, who is provided with the special services, each occupy two sets of contacts in the bank of connector 200, while the regular local subscribers A and C each occupy one set of contacts in the connector bank. While only one connector such as 200 is disclosed for the sake of clarity, it will be appreciated that actually there are a plurality of these connectors connected to the bank of first selectors such as 116.

An incoming selector 117 in the main exchange is connected to receive calls from a repeater such as 115 at the sub exchange and in turn has access to a bank of contacts in multiple with those of first selector 116 in the finder-selector link.

The local subscriber B who desires the special services is connected to an improved special service line circuit such as 300. This line circuit 300 is provided with two sets of conductors leading to the bank of connector 200, with one set being connected to the last, or "0," contacts of the particular level and the other set being connected to the adjacent, or ninth, contacts in the same level. A dialled connection with subscriber B can only be established by dialling the call number such as 9, which corresponds to the bank contacts adjacent the last bank contacts of the particular level, since it is necessary that connector 200 first must stop on these contacts in order for any of the aforementioned services to be provided.

The sub exchange in addition to disclosing the improved connector switch 400 also discloses an arrangement of standard and universal well-known components such as the line circuits 104–107, inclusive, distributor 111, finder-connector link comprising finder 113 and connector 400, repeater 115, attendant's trunk circuit 121 and attendant's cabinet 122. Connected to the line circuits 104, 105 and 107 are non-restricted subscriber F and restricted subscribers G and H, respectively. Line circuit 106 is shown as being connected to repeater 114 in the main exchange. Finder 113 of the finder-connector link has access to all the line circuits 104–107, while only the line circuits 104, 105 and 107 are connected to the bank of connector 400. The repeater such as 115 is connected to only the top or 0 level in the bank of connector 400, while the attendant's trunk circuits such as 121 are connected to only the ninth level in the connector bank. While all of the line circuits 104–107, inclusive, are shown as standard four conductor line circuits, the extra control (EC) conductor in line circuit 104 is shown as being grounded in any well-known manner in order to provide non-restricted service for the subscriber such as F. Therefore, only subscriber F is entitled to non-restricted service, whereas subscribers G and H are restricted as not being able to extend all types of calls other than those to the main exchange.

It will be appreciated that all of the finders, selectors, and connectors schematically shown both in block form and in detail operate in the well-known vertical and rotary motions, and as such are assumed to be of the well-known Strowger step-by-step type switches.

It will be appreciated upon viewing the drawings that each of the single lines extending from a switch to a line circuit; or from a switch to either a repeater or another switch; or from a switch to a trunk circuit; or from a line circuit to either a finder or connector; actually represent a plurality of conductors and have only been shown as single lines to conserve space and to simplify the drawings. These single lines have each been given reference numbers and will hereafter be referred to as leads.

A typical local main exchange call may be traced as extending from local subscriber A, line circuit 100 to finder 112, first selector 116, lead 73, connector 200, the fifth bank contacts in the sixth level of connector 200, lead 65 and line circuit 101 to local subscriber C.

On a call from subscriber A to the special service subscriber B, the extension may be traced over a similar described first path, but extending from the ninth bank contact of the fourth level of connector 200, lead 49 and line circuit 300 to subscriber B. However, if subscriber B is busy at this time, connector 200 will rotate its wipers one step to the tenth bank contact of the fourth level and the calling subscriber A will then camp on lead 40 leading to line circuit 300 and thereby cause a "wanted" tone to be sent to subscriber B. When subscriber B becomes idle a signalling connection is established thereto and the desired talking connection is subsequently established.

A call from subscriber A to the two-line business subscriber D may be traced over a similar described first path, but extending from the ninth bank contact of the third level, lead 39 and line circuit 102 to station D′. If subscriber D is busy at this time on station D′, connector 200 rotates its wipers one step to the tenth bank contact of the third level and extends the connection over lead 30 and line circuit 103 to signal station D″, which is the second line and substation of subscriber D.

A call from subscriber A of the main exchange to a local subscriber such as H in the sub exchange may be traced over a similar described first path but extending from the tenth bank contact of the second level, lead 20, repeater 114, lead 74, line circuit 106, finder 113, connector 400, and line circuit 107 to subscriber H.

A call from subscriber A of the main exchange to PBX 120 may be traced over a similar described first path, but extending from the bank contact representing the first idle trunk of a group in the level serving the PBX, lead such as 01, trunk circuit such as 118 and lead 70 to the PBX switchboard.

In the sub exchange on a call from a restricted subscriber such as G to a local subscriber such as H, the connections may be traced as extending from subscriber G, line circuit 105, finder 113, connector 400, contacts of the connector bank, lead 81 and line circuit 107 to subscriber H.

On a call from restricted subscriber G to the attendant's cabinet 122, the connection may be traced over a similar first path, but extending from a bank contact in the ninth level of the connector 400, lead 80, attendant's trunk circuit 121 and to the attendant's cabinet 122.

Calls from the non-restricted subscriber such as F to subscriber H and to attendant's cabinet 122 will extend over similar paths as described above, however since subscriber F is non-restricted, a call to a local subscriber such as C in the main exchange may be traced as follows: subscriber F, line circuit 104, finder 113, connector 400, a bank contact in the tenth level, a lead such as 79, repeater 115, lead 78, incoming selector 117, bank of incoming selector 117, lead 72, lead 73, connector 200, the fifth bank contacts in the sixth level, lead 65 and through line circuit 101 to subscriber C. Calls from subscriber F to other main exchange subscribers may be extended over similar and previously traced paths.

Figure 3:
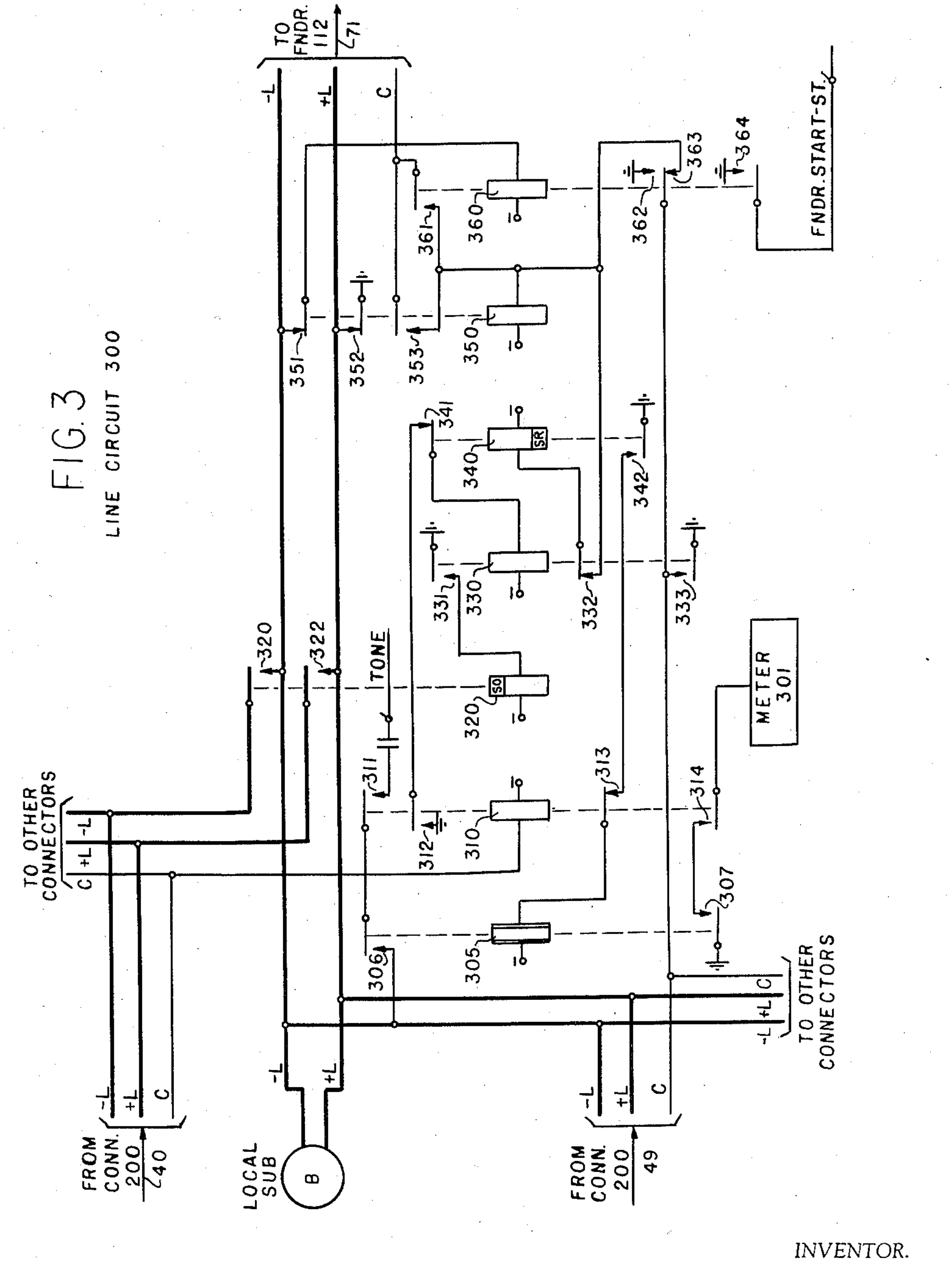
Fig. 3 shows in schematic form, the circuit arrangement of the special service line circuit for the main exchange subscribers and which is connected to the bank of the above-mentioned connector switch.

Referring to Figs. 1 and 3, it will be noted that the special service line circuit such as 300 may also be used with connectors having eleven contacts per level, with the normal access path of the line circuit being connected to the tenth bank contact and the auxiliary access path being connected to the eleventh bank contact, thereby maintaining the normal amount of call numbers in the exchange. It is also possible to use the elements of this line circuit in a last PBX trunk circuit of a PBX trunk group to provide this trunk with a "wanted" tone, when called and found busy, and to further provide camping service over the last set of connector terminals.

It is thought advisable to point out certain similarities common to both connectors 200 and 400. The detailed operational descriptions of these connectors will be covered later on in this specification, however. The functional operations of both connectors is quite similar for local calls. During trunk hunting calls, the normal switch-through relays of each of the connectors are disabled by the respective busy relays; rotary position springs in one connector and normal post springs in the other connector operate control relays which initiate the automatic rotary trunk hunting; the respective control relays connect stop relays to the test wipers, whereby the connectors are battery searching during trunk hunting; and the operations of the control relays, when idle trunks are found, cause the consequent switch-through operations.

The distributors such as 110 and 111 in both exchanges provide means for allotting idle finder-selector links and finder-connector links for use by the calling lines.

Having covered a general description of the system and apparatus, detailed operational descriptions will now be given relating to practical applications of the invention when taken into use during the subsequently described different specific types of connections.

*Main exchange call—Local subscriber A to local subscriber C*

In the following operational description of the above-named type of call, it will be appreciated that the calling local subscriber A and called local subscriber C are using substation telephone sets of the usual and well-known type, comprising all the standard and well-known instrumentalities.

Figure 2:
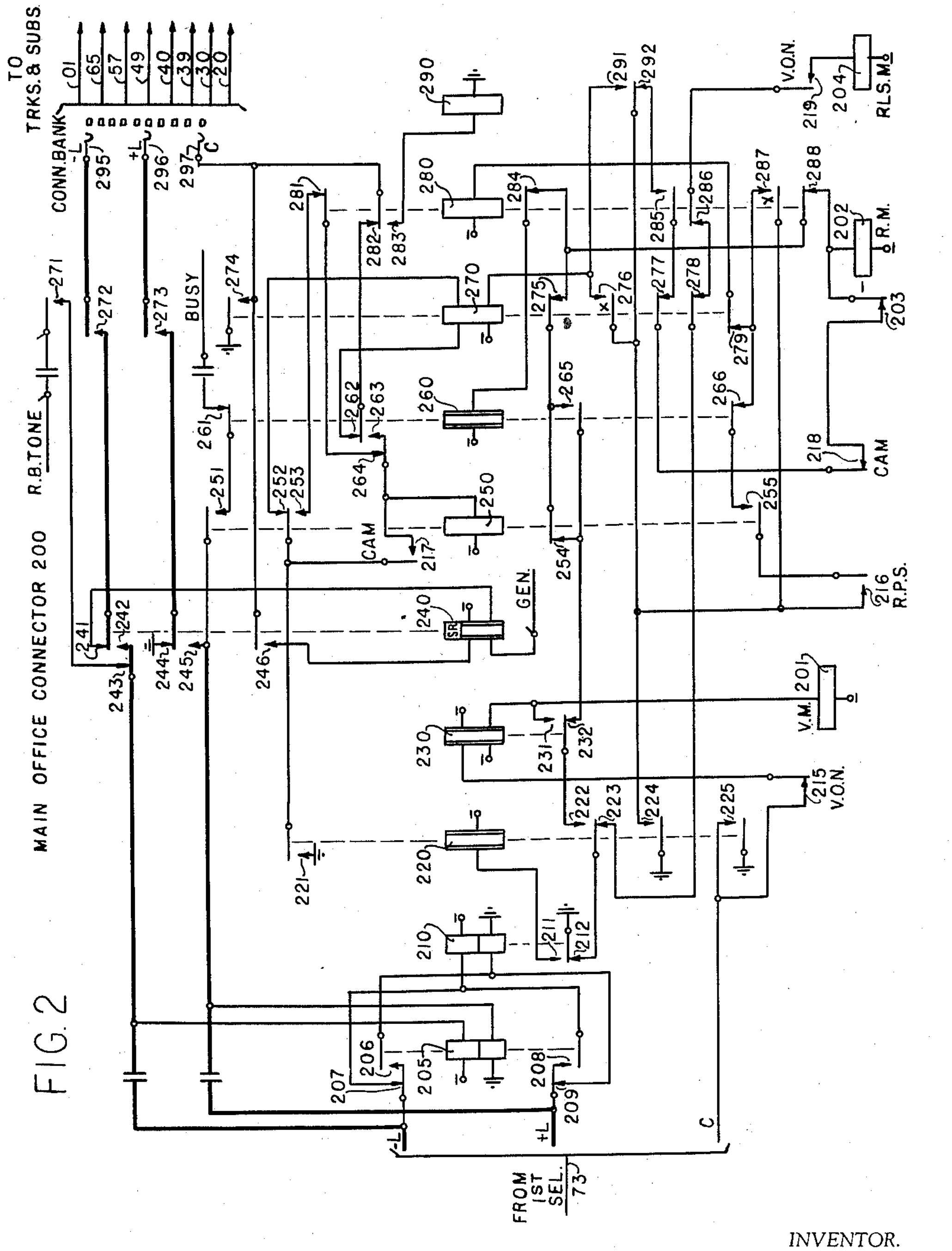
Fig. 2 shows in schematic form, the circuit of the main exchange connector switch which is connected to the bank of a first selector.

Referring in particular to Figs. 1 and 2, it is assumed that in order to initiate the extension of a call to local subscriber C, subscriber A has removed his receiver to complete the loop circuit, whereby the connection is extended through his line circuit 100 and into finder 112 by means of distributor 110 in a common and well-known manner. It is also assumed that first selector 116 is a selector of the well-known battery searching type, and that responsive to the dialling of the first digit of the call number of subscriber C by subscriber A, the selector consequently searches for and connects with a first idle one of the connectors, which in the present description is assumed to be the one disclosed in detail in Fig. 2 and represented as connector 200.

Responsive to selector 116 connecting with connector 200, switching through of the selector is accomplished in a well-known manner. The battery potential from idle connector 200 that selector 116 searched for and which was used to operate the switching relay (not shown) in the selector, may be traced as being provided over the following path: battery through the upper winding of the change over relay 230, vertical off-normal (VON) contacts 215, over the C conductor to the bank of selector 116, the selector wipers and through the switching relay (not shown) therein to ground. Relay 230 will normally operate in series with the selector switching relay.

At the time that the switching relay of selector 116 operates to extend the loop connection of the line and control conductors into connector 200, line relay 210 of the connector is energized over the extended loop in the usual and well-known manner.

In actuating its contacts, line relay 210 completes an obvious circuit at contacts 211 for operating the hold relay 220 and opens a point at contacts 212 in the normally incomplete pulsing circuit for the connector.

In actuating its contacts, hold relay 220 applies an operating ground at contacts 221 for future use by the connector, prepares a point at contacts 222 in both the vertical and rotary pulsing circuits, opens a point at contacts 223 in the circuit of release magnet 204, applies another operating ground at contacts 224 for future use by the connector and applies ground at contacts 225 to the C conductor leading to the selector banks to busy connector 200 to other attempts at seizure during the present call.

It will be noted that in the event that change-over relay 230 has not completed its operation at the present time, the closing of contacts 225 by relay 220 will apply a direct ground by way of VON contacts 215 to cause relay 230 to quickly complete its operation. However, as previously stated, relay 230 normally operates just prior to the operation of line relay 210. Therefore, in actuating its contacts, relay 230 closes a point at contacts 231 in the pulsing circuit to vertical magnet 201 and a point in the holding circuit for itself, and opens a point at contacts 232 in the circuit to rotary magnet 202 and relay 260.

No further operations take place until the calling subscriber A dials the second digit of the call number of subscriber C, which for this description will be assumed to be the digit 6. Since the operation of a line relay as a pulsing relay is well-known in the art, it is thought sufficient only to mention that line relay 210 responds to the dial pulses in the usual manner and that its pulsing contacts 212 alternately completes and opens an obvious pulsing circuit to vertical magnet 201 a total of six times.

The first vertical pulse causes vertical magnet 201 to step the switch off normal, thereby opening VON contacts 215. Since change-over relay 230 is constructed as being slow-to-release, this relay remains operated during vertical pulsing and for a predetermined period thereafter.

At the end of the dialling of the digit 6, it will be noted that wipers 295–297 inclusive, have been stepped up to the sixth vertical level; vertical magnet 201 is restored and change-over relay 230 will restore shortly thereafter. Upon restoring its contacts, relay 230 opens the vertical pulsing circuit at contacts 231 to vertical magnet 201 and at contacts 232 prepares a point in the circuits to rotary magnet 202 and relay 260.

The third and last digit of the call number of subscriber C is now dialled and for this description it will be assumed to be the digit 5. Line relay 210 responds to the dial pulses in the usual manner and at its pulsing contacts 212 alternately completes and opens the circuits of rotary magnet 202 and relay 260 a total of five times. These circuits may be traced as follows: ground, contacts 212, 222, 232, 254, 275; (1) down through contacts 288 and the winding of rotary magnet 202 to battery;

and (2) up through contacts 284 and the winding of relay 260 to battery.

Rotary magnet 202 directly follows these pulses and steps wipers 295–297 inclusive, in a rotary direction around the selected sixth vertical level to the fifth bank contacts therein. Relay 260 operates on the first rotary pulsing and due to its slow-to-release characteristics will remain operated during the rotary pulsing and for a predetermined time interval thereafter.

In actuating its contacts, relay 260 opens a point in the circuit at contacts 261 for the application of busy tone, opens a point in the circuit of the switch-through relay 270 at contacts 262, completes a point in the busy test circuit for the busy relay 250 at contacts 263, opens a point in the locking circuit for the busy relay 250 at contacts 264, prepares an alternate point in the rotary pulsing circuit at contact 265 and opens a further point in the circuit at contacts 266 to relay 280.

If it is assumed for the moment that called subscriber C is busy, the busy test and the return of busy tone to the calling line is accomplished in the manner as described hereafter. Since subscriber C is is busy, the C wiper 297 encounters the busying ground (not shown), which is applied to the contact engaged thereby in the bank of connector 200 in a well-known manner from the finder (not shown) in use by subscriber C, or from another connector switch, for completing a circuit to operate busy relay 250. This circuit may be traced as extending from the above-mentioned ground and extended to C wiper 297, contacts 282, 263 and through the winding of busy relay 250 to battery. In actuating its contacts, relay 250 prepares a point at contacts 251 in the circuit for the extension of busy tone to the calling line, opens a point at contacts 252 in the energizing circuit to switching relay 270, prepares a point at contacts 253 in the holding circuit for itself, opens a point at contacts 254 in the pulsing circuit to rotary magnet 202 and itself and at contacts 255 performs no present useful function.

Relay 260 will restore at the end of the previously mentioned interval of time, thereby completing the circuit at contacts 261 for the application of busy tone to the line leading to the calling subscriber A in a well-known manner, opens the previous energizing circuit at contacts 263 to the busy relay 250, completes an alternate holding circuit at contacts 264 for the busy relay 250, reconnects a point in the energizing circuit to the switch-through relay 270 at contacts 262, further opens a point in the pulsing circuit at contacts 265 to rotary magnet 202 and itself and closes contacts 266 with no effect at the present.

Upon receipt of busy tone, calling subscriber A is informed that called subscriber C is busy and he thereafter causes the release of the connection in a well-known manner responsive to replacing his receiver on his telephone.

It is assumed, for the purposes of the present description however, that called subscriber C is not busy and under these circumstances, busy relay 250 does not operate, while relay 260 restores as previously described. At this point the closing of contacts 262 by the restoring of relay 260 completes a circuit for operating switch-through relay 270 in series with the bridge cut-off relay (not shown) in subscriber C's line circuit. This circuit for operating relay 270 may be traced from ground at contacts 221, 252, through the upper winding of relay 270, contacts 262, 282, C wiper 297 and through the aforementioned bridge cut-off relay to battery.

In actuating its contacts, switch-through relay 270 completes its own locking circuit at X contacts 276, completes the circuit at contacts 271 for the application of ring back tone to the calling subscriber A, further extends the talking connection at contacts 272 and 273, completes the application of ringing current to the called line, prepares a point in the locking circuit at contacts 274 for ring cut-off relay 240 and further uses this ground at these contacts as a busying ground to busy subscriber C to incoming calls, opens another point at contacts 275 in the rotary pulsing circuit, opens contacts 277 with no effect on the present connection at this time, opens a point at contacts 278 in the circuit to the release magnet 204 and opens contacts 279 with no effect on the present connection at this time. The application of ringing current may be traced as extending from interrupted generator through the lower winding of relay 240, contacts 241, 272, the −L line conductor of the connector, wiper 295, out over the −L line conductor to the ringer at subscriber C, back over the +L line conductor to the connector bank and wiper 296, the +L line conductor of the connector, contacts 273 and contacts 244 to ground. After a reasonable length of time, called subscriber C answers the ringing signal by removing his handset to complete his loop circuit, thus causing ring cut-off relay 240 to operate in a well-known manner.

In actuating its contacts, ring cut-off relay 240 opens contacts 241 and 244 to remove the ringing current from the called line, closes contacts 242 and 245 to complete the talking connection, removes ring back tone from the calling line at contacts 243 and completes an obvious locking circuit at contacts 246 for itself through its upper winding. The completion of the talking connection at contacts 242 and 245 by the operation of relay 240 also completes an energizing circuit for operating the battery feed and battery reversing relay 205 in a well-known manner. In actuating its contacts, relay 205 closes contacts 206 and 208 and opens contacts 207 and 209 thereby reversing the battery potential applied by line relay 210 to the talking conductors leading to calling subscriber A in a well-known manner. This reversal of battery to the calling subscriber A may be used for any of the common and well-known reasons.

Conversation between calling subscriber A and called subscriber C may now take place, with line relay 210 supplying talking battery to subscriber A and battery reversing relay 205 supplying talking battery to subscriber C.

At the end of conversation and responsive to the calling party hanging up, the operated equipment is restored to normal in a well-known manner and conditioned to handle future calls.

*Main exchange call—Local subscriber A to PBX*

In the following operational description of the above-mentioned type of call, it will be appreciated that the calling local subscriber A desires to place a call to a PBX such as 120 and shown in Fig. 1.

Referring for the moment to Fig. 1, wherein the contacts of the bank accessible by the wipers of connector 200 is shown more in detail, it will be noted that each contact of the entire tenth level is connected to an individual trunk circuit terminating at the switchboard of PBX 120. Three trunk circuits connected to the last three contacts of the ninth level are shown as the trunk group leading to a different PBX. Upon referring to the illustrated tenth level, it will be seen that only the connection of the first trunk circuit such as 118 is represented in box form, however the connections of the remaining nine trunk circuits of the group associated with PBX 120 are all similar. It will be noted that trunk 118 is connected to the first bank contact in the tenth level, therefore requiring the digits 01 to be dialled into the connector in order for the connector wipers to connect therewith. It will also be appreciated that the digits 01 represent the common trunk group, or PBX, call number of PBX 120 and that the dialling of these digits will cause connector 200 to connect with the first idle trunk in this group regardless of the bank contact that the trunks are connected to. It will further be appreciated that rotary position (RP) springs 216 (Fig. 2) are arranged to close at the time that the connector wipers engage the bank contacts corresponding to the first trunk of a PBX group, but will open and remain so when the wipers are rotated to any subsequent trunk or trunks in the same group if the common group call number was the only number dialled.

Referring now in particular to Figs. 1 and 2, it is assumed that calling subscriber A has initiated the present type of call and dialled a first digit to extend the connection into connector 200 in the same manner as previously described. The second digit 0 and the third digit 1 are respectively dialled into connector 200 with similar operations taking place also as previously described, up to the time that the busy test is made. It will be remembered that wipers 295, 296 and 297 are engaged with the first contacts of the tenth levels and that RP springs 216 are now closed to prepare a point in the circuit to relay 280.

At this point in the description, it will be noted that relay 260 is still operated and that the busy test circuit for operating busy relay 250 is either completed or not depending whether C wiper 297 encounters a ground or battery potential as applied thereto by the respectively busy or idle trunk.

For this part of the description, it will be assumed that at least the first trunk such as 118 in the group leading to PBX 120 is busy. A busying ground potential is therefore extended from trunk 118 back over the C conductor to the contact in the bank of connector 200 and encountered by C wiper 297.

The busy test by relay 250 is made prior to the restoration of relay 260 and since wiper C297 encounters the ground potential from the busy trunk 118 as mentioned, relay 250 operates to cause the same operations in the connector as previously described, with the exception that a point is prepared in the circuit at contacts 255 for relay 280. Relay 260 subsequently restores after the aforementioned time interval, with the same operations taking place in the connector as previously described, while additionally completing the circuit at contacts 266 for operating relay 280. The circuit for operating relay 280 may be traced as extending from ground at contacts 224, RP springs 216, contacts 255, 266, 279 and through the winding of relay 280 to battery.

Relay 280 operates extremely fast and in actuating its contacts, completes its own holding circuit at X contacts 287 by shunting RP springs 216, contacts 255 and 266, opens the locking circuit at contacts 281 of release relay 250, disconnects switch-through relay 270 at contacts 282 from C wiper 297, connects auxiliary test relay 290 at contacts 283 to the C wiper 297, opens a point in the previously described pulsing circuit at contacts 284 to relay 260, completes a stepping circuit at contacts 285 for rotary magnet 202, opens a point in the circuit at contacts 286 for the release magnet 204 and opens the previously described pulsing circuit at contacts 288 to rotary magnet 202. The stepping circuit for rotary magnet 202 may be traced as extending from ground at contacts 224, 292, 285, 277, cam springs 218, interrupter contacts 203 and through the winding of rotary magnet 202 to battery.

It will be noted that an extremely short pulse of busy tone may be sent to the calling line for a period of time corresponding to the operate time of relay 280 and the release time of busy relay 250. However, this pulse is of such a short duration as to be barely noticeable before it is to be removed by relay 250. It will be appreciated that busy relay 250 releases at the same time that rotary magnet 202 energizes.

The restoration of busy relay 250 causes the same operations in the connector as previously described, with the exception that the previously mentioned holding circuit of relay 280 now becomes effective and may be traced from ground at contacts 224, X contacts 287, contacts 279 and through the winding of relay 280 to battery.

The energization of rotary magnet 202 causes the magnet to advance its wipers 295, 296 and 297 one rotary step to the next, or second, bank contact in the tenth level and at the same time causes the magnet to open its interrupter contacts 203, thereby opening the magnet's energizing circuit to cause it to restore. During the time that magnet 202 is restoring, C wiper 297 conducts a test for busy, bearing in mind that the auxiliary test, or stop, relay 290 is now connected by way of contacts 293 to the C wiper. If a ground potential is encountered by C wiper 297, no operations take place in the connector other than the recompleting of the stepping circuit for rotary magnet 202 by its interrupter contacts 203 at the time of the magnet's restoration. Rotary magnet 202 therefore repeats the above-mentioned cycle of operation, with the test for busy being made of the next bank contact engaged by the C wiper during the time that the magnet is restoring. These cycles of operation are continued until a battery potential is located by C wiper 297 on one of the bank contacts (thus indicating an idle trunk circuit) or until all ten trunks in the group of PBX 120 have been tested and found busy, at which time the connector wipers are rotated off the tenth bank contact. At this time an overflow cam operates to close cam spring contacts 217 to complete an obvious circuit for operating busy relay 250 and opens cam spring contact 218 to open the rotary stepping circuit to prevent any further rotary stepping by rotary magnet 202. Busy relay 250 operates as previously described, to cause a busy tone indicative of an all-trunks-busy to be transmitted back to the calling subscriber A. The connection may thereafter be released in a well-known manner by subscriber A.

If it is assumed that one of the trunk circuits subsequent to the first trunk circuit such as 118 is idle, a battery potential is applied to the C conductor bank contact corresponding to that particular trunk. Responsive to a busy test being made of this trunk, C wiper 297 encounters this battery potential and an obvious circuit is completed for operating auxiliary test relay 290. Relay 290 operates extremely fast during the release of rotary magnet 202 and before the interrupter springs of the magnet can again complete its energizing circuit. In actuating its contacts, relay 290 completes an obvious circuit at contacts 291 for operating switch-through relay 270 and opens the stepping circuit at contacts 292 to rotary magnet 202 to prevent any subsequent operations thereof.

Switch-through relay 270 operates in the same manner as previously described to extend the signalling connection by way of the trunk circuit to the switchboard at PBX 120. This incoming call is thereafter handled and extended by the PBX operator in any well-known manner.

The equipment is restored to normal upon completion of the call by subscriber A in the same manner as mentioned in the previous section.

It will be assumed in this instance that the first trunk circuit such as 118 is idle, therefore when the normal busy test at this trunk is made busy relay 250 does not operate and the battery potential from this idle trunk causes switch-through relay 270 to operate in the previously described manner. The operation of switch-through relay 270 opens its contacts 279 to prevent the operation of relay 280, whereby the previously described stepping circuit to rotary magnet 202 is incomplete. Thus it will be seen that the operations of the connector are the same as those described during the local call in the previous section. The signalling connection is extended by way of trunk circuit 118 to the switchboard at PBX 120 and thereafter handled by the PBX operator.

It will be appreciated that if any digits corresponding to the trunk circuits othre than the first trunk in the group leading to PBX 120 are dialled, such as 05, the operations of the connector are the same as described for the local call in the previous section, since the connector does not stop on the first set of contacts in the trunk group and relay 280 will not be operated to provide the automatic rotary stepping of magnet 202. The busy test is made in the same manner as previously described, in which the connector switches through if the particular trunk tests idle, or busy tone is transmitted to calling subscriber A if the trunk tests busy.

*Main exchange call—Local subscriber A to two-line subscriber D*

In the following operational description of the above-named type of call, it will be appreciated that the calling local subscriber A desires to place a call to subscriber D.

Referring for the present to Fig. 1, it will be seen that subscriber D is disclosed as being a two-line business subscriber, wherein substation D' terminates the line corresponding to lead 39 and substation D'' terminates the line corresponding to lead 30. These two leads are connected to the last two contacts in the third level of the bank of connector 200 and as such are accessible to the connector wipers responsive to the dialling of the call number having the last two digits 39 or 30, respectively.

It will be appreciated that the directory listing for subscriber D normally would include only the listing for the first line of substation D', which is therefore the call number containing the last two digits 39. Rotary position springs 216 (Fig. 2) are arranged to close at the time that the connector wipers engage only the bank contacts in the third level corresponding to the first line of subscriber D in response to dialling the call number containing the last two digits 39 but will remain open on all other positions of the connector wipers in the third level.

Referring now in particular to Figs. 1 and 2, it is assumed that calling subscriber A has initiated the present type of call and dialled a first digit to extend the connection into connector 200 in the same manner as previously described. The second and third digits 3 and 9 are respectively dialled, with the connector operating in the same manner as previously described in the section covering a call from local subscriber A to a PBX.

It is thought unnecessary to describe the operations of the connector in detail in this section since they are the same as described in the aforementioned section covering a call to a PBX. For this type of call, RP springs 216 are arranged to close and provide an automatic rotary stepping circuit to operate the connector and advance its wipers to the next bank contacts representing line 30 if the line corresponding to lead 39 is first called, tested and found busy. If the line corresponding to lead 39 is not busy the connector switches through in the usual manner, while if both lines are busy the connector rotates its wipers off the bank and busy tone is returned to the calling subscriber in the previously described manner. If the call number representing the second line corresponding to lead 30 is the first number dialled, automatic rotary stepping is not provided and the connector will either switch-through if the line is idle or return busy tone if the line is busy in the same manner as described in the above-mentioned section.

The equipment is restored to normal subsequent to an all-lines-busy, or upon completion of conversation, in the same manner as previously described.

*Main exchange call—Local subscriber A to special service local subscriber B*

In the following operational description of the above-named type of call, it will be appreciated that the calling local subscriber A desires to place a call to special service local subscriber B.

Referring to Fig. 1 for the present, it will be seen that while subscriber B is shown as having only one telephone, or substation, and one line circuit, this line circuit is connected by means of two separate leads 49 and 40 to the last two respective contacts in the fourth level of the bank of connector 200. Even though two sets of contact terminals in the connector bank are shown as being used, subscriber B is assigned only one call number, which for the purpose of the present description is assumed to contain 49 as its last two respective digits. Thus it will be appreciated that all calls to subscriber B are routed over the ninth bank contact of the fourth level of connector 200 in a manner to be described more in detail later on in this section.

Referring now in particular to Figs. 1, 2 and 3, it is assumed that subscriber A has initiated the present type of call and dialled a first digit to extend the connection into connector 200 in the same manner as previously described. The second and third digits 4 and 9 are respectively dialled, with the connector operating in the same manner also as previously described. At this stage of the operation it will be noted that wipers 295, 296 and 297 are engaged with the ninth bank contacts of the fourth level and subsequent operations during the present description will depend on the idle or busy condition of subscriber B.

Referring for the present to the modified line circuit 300 of subscriber B and shown in detail in Fig. 3, it will be seen as stated before that the two sets of line conductors and control conductors of this line circuit and comprising leads 49 and 40 are connected to the two sets of contact bank terminals of connector 200 as shown. further, it will be seen that this line circuit is shown as being connected to a finder switch such as 112 by means of lead 71. In order to properly describe the operation of this line circuit when used in conjunction with connector 200 for the present type of call, it is thought best to first describe the operations thereof, in this line circuit during its normal idle and busy condition in order to more clearly bring out its special operations and features for the above-named type of call. It is thought necessary to only mention that in its idle condition, the equipment in line circuit 300 is at normal and unoperated, thereby enabling subscriber A to either receive incoming or make outgoing calls. Accordingly, line circuit 300 may be busied as hereafter described responsive to either an incoming or outgoing call. When subscriber B initiates a call, line relay 360 operates over the loop circuit, which is completed in the usual manner at the hookswitch contacts (not shown) responsive to the removal of his receiver (also not shown). The circuit for operating line relay 360 may be traced from ground at contacts 352, the +L line conductor, the completed loop circuit, the —L conductor, contacts 351 and through the winding of relay 360 to battery.

In actuating its contacts, line relay 360 prepares a point at contacts 361 for energizing bridge cut-off relay 350, applies ground potential at contacts 362 to the C conductor for busying the connector banks to incoming calls for the present, opens a point at contacts 363 in the operating circuits of relays 340 and 350 to prevent seizure by a connector during an attempted incoming call and completes the finder start circuit at contacts 364 for causing a finder similar to 112 to start and seize the calling line of subscriber B.

At the time that the finder seizes the calling line of subscriber B, ground is returned from the C conductor of the finder by way of lead 71 to the C conductor of the line circuit for operating relays 340 and 350 over an obvious circuit.

In actuating its contacts, relay 340 opens a point at contacts 341 in the circuit to relay 330 and completes an obvious circuit at contacts 342 for operating relay 305. In actuating its contacts, bridge cut-off relay 350 opens the previously traced energizing circuit, at contacts 351 and 352, to line relay 360 and at contacts 353 completes an obvious locking circuit for itself and relay 340 to the grounded C conductor in the finder. In actuating its contacts, relay 305 prepares a point at contacts 306 for the application of a "wanted" tone to the calling line and at contacts 307 prepares a point in the circuit for operating meter 301.

In releasing, relay 360 opens the previously traced operating circuit at contacts 361 to relays 340 and 350, removes the previously described busying ground to the connector banks at contacts 362, extends the busying ground from the finder to the connector banks at contacts 363, and opens the finder start circuit at contacts 364. Line circuit 300 is thus busied on an outgoing call by subscriber B. Therefore, on present incoming calls, the ground which is sent over the C conductor and lead 49 from the busy finder to the contact terminals of the connector such as 200 will cause the busy relay in the connector to operate in the previously described manner whenever the wipers of this connector are operated to engage these terminals.

When line circuit 300 of subscriber B is made busy by an incoming call, it will be seen that normally instead of the above-mentioned busy ground, battery potential through the windings of relays 340 and 350 is applied to the connector terminals over the C conductor and lead 49 for causing the switch-through relay such as 270 in the connector to operate with these two relays. Line relay 360 does not operate, but the circuit for relay 350 is completed by relay 340 as previously described. Therefore, it will be noted that during the present described busy condition of line circuit 300, relays 305, 340 and 350 are the relays operated as previously described.

Thus it is clearly seen that a call from subscriber A to subscriber B, when subscriber B is idle, is handled in the same manner and causes the same operations as described in the section covering a call from subscriber A to local subscriber C.

The more detailed operations covering a call from subscriber A to subscriber B, when subscriber B is busy, will now be continued. Continuing from the portion described in the present section where the last two digits 4 and 9 were dialled by subscriber A and wipers 295, 296 and 297 of connector 200 have engaged the ninth bank contacts of the fourth level; the busying ground from the finder similar to 112 is encountered by C wiper 297 for completing a previously described circuit for operating busy relay 250. It will be remembered that RP springs 216 are arranged to close when the wipers of the connector engage the first set of contacts leading to all special service subscribers (such as subscriber B which terminates in the ninth bank contact of the fourth level). Therefore when busy relay 250 operates from the above-mentioned ground, an automatic rotary circuit is completed as previously described for causing connector 200 to advance its wipers one rotary step in the same manner as described in former sections covering calls from subscriber A to a PBX and from subscriber A to the two-line business subscriber D. Thus when the wipers of the connector 200 engage the tenth bank contact of the fourth level, the connection is extended to line circuit 300 over lead 40. At this time a series circuit is completed for operating relay 290 and for operating relay 310 in line circuit 300 and may be traced as extending from ground, through the winding of relay 290, contacts 283, C wiper 297 and engaged bank contact, lead 40, the C conductor of the line circuit and through the winding of relay 310 to battery.

In actuating its contacts, relay 310 completes an obvious circuit at contacts 311 for applying "wanted" tone to the —L line conductor leading to the currently busy local subscriber B, prepares a point at contacts 312 in the operating circuit to relay 330, opens the circuit at contacts 313 for restoring relay 305 and at contacts 314 completes an obvious circuit for operating meter 301.

It will be noted that responsive to the operation of relay 290, switch-through relay 270 of the connector operates to cause the same operations in the connector as described previously, wherein the talking conductor connection is extended to the line circuit and ringing current is transmitted over this connection. However since the extension of the talking conductors of this connection are not yet completed in line circuit 300 to subscriber B, the ringing current has no effect at the present. Also, calling subscriber A will receive ring back tone in the usual manner even though called subscriber B is busy.

The "wanted" tone that was applied to the talking conductor leading to busy subscriber B serves to inform him that he has received an incoming call and that the calling party is now camping on the second set of conductor terminals and is awaiting the termination of his present call.

Relay 305 is constructed as being slow-to-release and will restore after an interval of time, at which time the "wanted" tone is removed from the line to subscriber B and the circuit for operating meter 301 is opened. It will thus be seen that meter 301 is operated to meter only the number of camping calls, or the times that "wanted" tone is given.

If subscriber B should receive another incoming call during the time that the first set of connector terminals leading thereto are busy and the time that subscriber A is camping on his second set of connector terminals, the connector associated with this particular calling party is operated in the same manner as previously described to rotate its wipers off the bank and cause busy tone to be returned to the calling party.

It is assumed that subscriber B terminates his present conversation as quickly as possible and replaces his receiver to open his loop circuit and cause the associated finder to restore. At the time this finder restores, the circuit to relays 340 and 350 is opened and they restore. Relay 350 will restore first, since relay 340 is slow-to-release, and prepares the circuit at contacts 351 and 352 for line relay 360 and opens the previously described holding circuit at contacts 353 for itself and relay 340. In restoring, relay 340 completes an obvious circuit at contacts 341 for operating relay 330 and opens a further point at contacts 342 in the circuit to relay 305.

In actuating its contacts, relay 330 completes an obvious circuit at contacts 331 for operating relay 320, opens a point at contacts 332 in the circuit to relay 340 and applies ground at contacts 333 for busying the first set of terminals in the connector banks to prevent subscriber B from receiving incoming calls over this set during the time that the present connection is established between subscriber A and subscriber B over the second set. This ground applied at contacts 333 also completes an obvious circuit for operating relay 350. Relay 320 is constructed as being slightly slow-to-operate and will therefore operate after relay 350 operates.

In actuating its contacts, relay 350 opens the circuit at contacts 351 and 352 to prevent the operation of line relay 360 during the present type of call. In actuating its contacts, relay 320 completes the ringing connection at contacts 321 and 322 from connector 200 to subscriber B in a well-known manner. The answering of this call by subscriber B causes the operation of the ring-cut-off relay 240 in the connector in a well-known manner. Relay 240 causes the talking connection to be completed in the same manner as previously described, in order for subsequent conversation between subscriber A and subscriber B to take place.

At the end of conversation and responsive to the calling and called subscriber replacing their receivers, the equipment associated with this type of call is restored in a well-known manner and conditioned to handle future calls.

*Sub exchange call—Restricted local subscriber G to local subscriber H*

In the following operational description of the above-named type of call, it will be appreciated that the calling sub exchange restricted local subscriber G and called local subscriber H are using substation telephone sets of the usual and well-known type, comprising all the standard and well-known instrumentalities.

Figure 4:
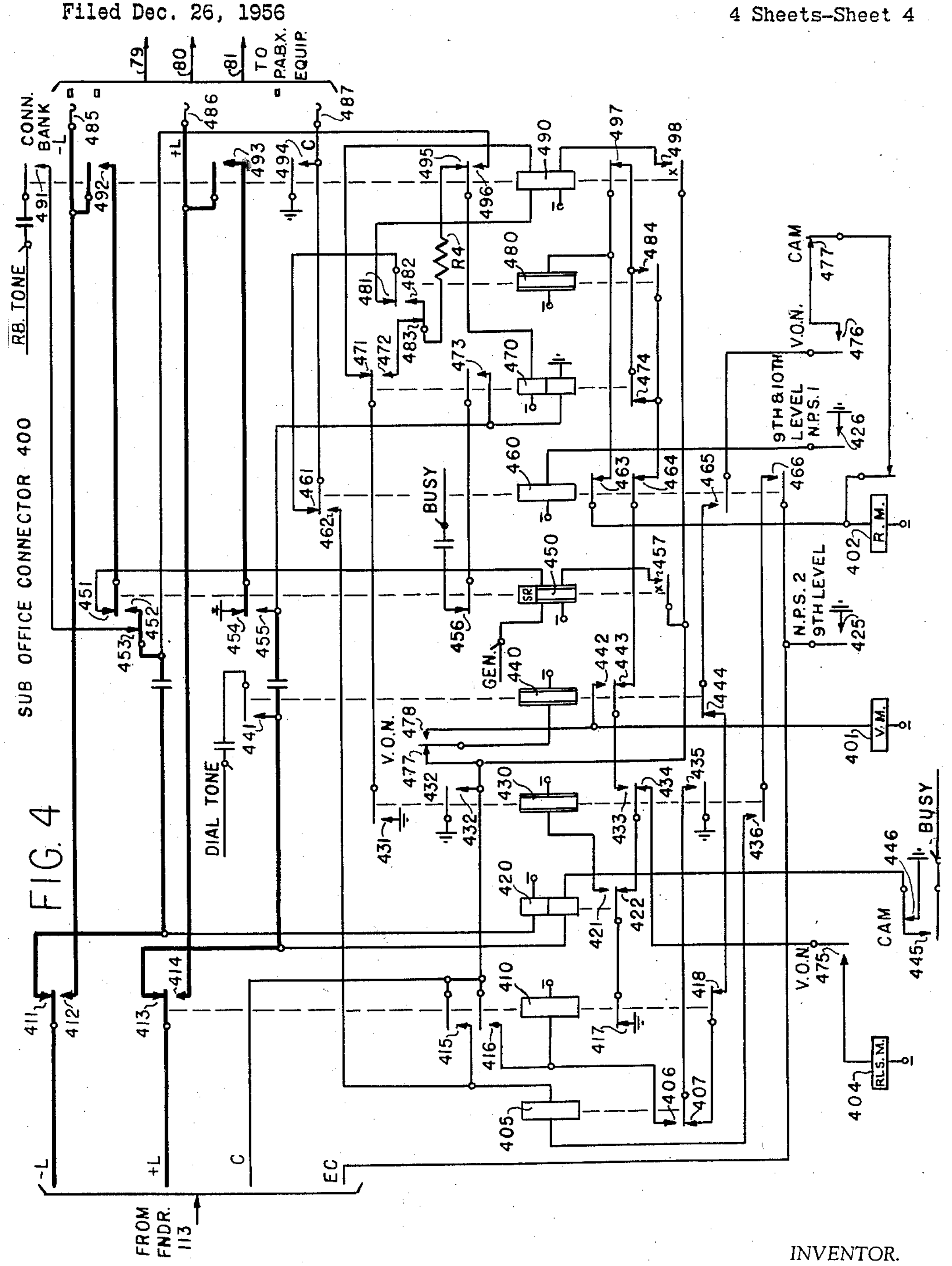
Fig. 4 shows in schematic form, the circuit of the sub exchange connector switch which is the connector portion of a finder-connector link serving the subscribers located at the sub exchange.

Referring in particular to Figs. 1 and 4, it is assumed that in order to initiate the extension of a call to local subscriber H, subscriber G has removed his receiver to complete the loop circuit, whereby the connection is extended through his line circuit 106 and into finder 113 by means of distributor 111 in a common and well-known manner.

While the contact bank of connector 400 is not shown in detail, it is assumed to comprise the standard ten levels, with each level having ten bank contacts. It will be noted that the first eight levels of connector 400 serve the local subscribers in the PABX, or sub exchange, with the ninth level being used only on calls to an attendant's cabinet located therein and the tenth level being used only on calls from the sub exchange to the main exchange.

The closed loop circuit of the line of calling subscriber G is extended into connector 400 responsive to the seizure of the calling line by finder 113, thereby completing an obvious circuit for operating line relay 420 over the −L and +L line conductors.

In actuating its contacts, line relay 420 completes an obvious circuit at contacts 421 for operating relay 430, and opens a point at contacts 422 in the vertical and rotary pulsing circuits and the circuit to the release magnet 404.

In actuating its contacts, relay 430 prepares a point at contacts 431 in the circuit for relay 490, completes an obvious circuit at contacts 432 for operating change-over relay 440 and also sends a holding ground back to the finder, prepares a point at contacts 433 in the pulsing circuit, opens a further point at contacts 434 in the circuit to the release magnet 404, applies an operating ground at contacts 435 for use by the connector and prepares a point at contacts 436 in the circuit for relay 405.

In actuating its contacts, relay 440 completes a circuit at contacts 441 for the application of dial tone to the calling line in a well-known manner, prepares a multiple point at contacts 442 in the pulsing circuit to vertical magnet 401 and a holding circuit for itself, opens a multiple point at contacts 443 in the pulsing circuit to rotary magnet 402 and the energizing circuit of relay 480 and opens a point at contacts 444 in the automatic stepping circuit to rotary magnet 402.

Subscriber G is thereby notified responsive to receipt of the above-mentioned dial tone that the call number of subscriber H may now be dialled. For the present description it is thought unnecessary to assign a specific call number to subscriber H. Therefore, since the bank of the connector is not shown in detail as mentioned, and since it has been previously stated that subscriber H is a local subscriber and that all local subscribers are connected to bank contacts in the first eight levels of connector 400, the value of the first digit of the call number must necessarily be limited from 1 through 8, inclusive. It is assumed that a two digit call number correponding to a set of contacts in one of these levels is dialled to cause the connector to operate and connect with subscriber H as hereafter described. Subscriber G therefore dials the first digit, thus causing the loop circuit to be interrupted a number of times corresponding to this digit. Line relay 420 follows these loop interruptions in a well-known manner by deenergizing and energizing a like number of times.

Responsive to the deenergization of line relay 420 during the first half of the first pulse, the energizing circuit to relay 430 is opened at contacts 421 and the circuit is completed at contacts 422 for operating vertical magnet 401. The slow-to-release characteristics of relay 430 will cause this relay to remain operated during pulsing. The pulsing circuit for vertical magnet 401 may be traced as extending from ground at contacts 417, 422, 433, 442 and down through the winding of vertical magnet 401 to battery. During the last half of the first pulse, line relay 420 is again energized to recomplete the circuit to relay 430 and open the circuit to vertical magnet 401. Vertical magnet 401 thereafter releases and raises wipers 485, 486 and 487 one vertical step. The operations of line relay 420 and the consequent operations of vertical magnet 401 continue in the same manner until the dial of subscriber G restores to normal at the end of the first dialled digit, with the connector wipers standing opposite the level corresponding to the value of the first dialled digit.

Vertical off-normal springs (VON) 477 and 478 respectively open and close at the end of the first vertical pulse, thereby opening the original energizing circuit to the change-over relay 440 and closing the vertical pulsing circuit to this relay so that it remains held operated by pulses of the first dialled digit over the previously described vertical pulsing circuit. VON springs 475 and 476 also close responsive to the first vertical step, with no respective effects on the circuits to the release magnet 404 and the rotary magnet 403 for the present.

Change-over relay 440 restores after the lapse of an interval of time and after the first digit has been dialled, but before the second digit is dialled. In restoring, relay 440 removes dial tone at contacts 441, opens the vertical pulsing circuit at contacts 442, prepares a point at contacts 443 in the rotary pulsing circuit and closes contacts 444 with no effect on the connector operations during the present type of call.

The second digit of the call number is now dialled, with line relay 420 responding to the interruptions of the loop circuit in the same manner as previously described. Line relay 420 restores during the first half of the first pulse and at contacts 422 completes the circuits for operating relay 480 and rotary magnet 402. These circuits may be traced as extending from ground, contacts 417, 422, 433, 443, 464, 474, 497; (1) up through the winding of relay 480 to battery; (2) contacts 463 and down through the winding of rotary magnet 402 to battery.

In actuating its contacts, relay 480 opens a point at contacts 481 in the circuit of local switch relay 490, prepares a point at contacts 482 in the busy test circuit for the busy relay 470, opens a point at contacts 483 in the locking circuit for busy relay 470 and closes an alternate point at contacts 484 in the previously traced rotary pulsing circuit.

Line relay 420 reenergizes during the last half of the first pulse and opens the previously traced rotary pulsing circuit at contacts 422. Since relay 480 is constructed as being slow-to-release, this relay holds operated due to receipt of pulses of the second dialled digit. Rotary magnet 402 operates during the time that the rotary pulsing circuit is closed by line relay 420 and thus advances the connector wipers 485, 486 and 487 one rotary step in the selected vertical level. Rotary magnet 402 thereafter restores during the time that rotary pulsing circuit is opened by line relay 420. The operation of line relay 420 and the consequent operations of rotary magnet 402 continue until all the pulses corresponding to the second dialled digit have been received and recorded according to the position of the connector wipers.

At this time it shall be assumed that the connector wipers 485 through 487 are now engaged with the set of bank contacts to which the conductors from line circuit 107 are connected. Also, since rotary pulsing has ceased and line relay 420 is steadily operated thereafter, the holding circuit to relay 480 is opened. However, before slow-to-release relay 480 has had time to restore, a test as to the busy condition of called subscriber H is made.

It will first be assumed that called subscriber H is busy. A ground potential is therefore encountered by C wiper 487 which is engaged with the bank contact terminating the C conductor from line circuit 107 of the busy subscriber H. A circuit for operating busy relay 470 is thereby completed and may be traced as extending from the ground encountered by C wiper 487, contacts 461, 482, resistance R4, contacts 495 and through the upper winding of relay 470 to battery. In actuating its contacts, busy relay 470 opens another point at contacts 471 in the circuit to local switching relay 490, prepares a point at contacts 472 in the holding circuit for itself, completes an obvious circuit at contacts 473 for the application of busy tone to the calling line of subscriber G and opens a multiple point at contacts 474 in the pulsing circuit to rotary magnet 402 and the pulse holding circuit to relay 480. It is assumed that slow-to-release relay 480 restores at this time with no apparent effect on the connector circuits other than to complete a locking circuit at contacts 483 for busy relay 470. This locking circuit may be traced as extending from ground, contacts 431, 472, 483, resistance R4, contacts 495 and through the upper winding of relay 470 to battery. Nothing further takes place at this time until calling subscriber G replaces his receiver responsive to the receipt of busy tone, at which time the associated equipment is restored in a well-known manner.

In order to continue with the present description, it will be assumed that the called subscriber H is not busy. In this case, a battery potential is encountered by the C wiper 487 instead of the aforementioned ground potential, thereby preparing a circuit for operating the local switching relay 490. Busy relay 470 does not operate in this case and after an interval of time slow-to-release relay 480 restores as previously described to complete a circuit at contacts 481 for operating relay 490. This circuit for operating relay 490 may be traced as extending from ground, contacts 431, 471, through the upper winding of relay 490, contacts 481, 461, C wiper 487 and engaged bank contact and over the C conductor to battery (not shown) in line circuit 107 of subscriber H.

In actuating its contacts, relay 490 completes its own obvious holding circuit at X contacts 498 from the ground at contacts 432, completes a circuit at contacts 491 for transmitting ring back tone to subscriber G in a well-known manner, completes a circuit at contacts 492 and 493 for transmitting ringing current to signal the subscriber H, applies ground at contacts 494 for busying the connector bank contacts corresponding to subscriber H to other incoming calls during the course of the present one, opens a point in the circuit at contacts 495 for the busy relay 470, closes a point at contacts 496 in the battery feed circuit to provide talking battery for subscriber H and opens a point at contacts 497 in the rotary pulsing circuits to relay 480 and rotary magnet 402. The ringing current circuit may be traced as extending from battery-interrupted generator through the upper winding of ring-cut-off relay 450, contacts 451, 492, the −L talking conductor of connector 400, wiper 485 and engaged bank contact, the −L talking conductor to line circuit 107, the ringer (not shown) of subscriber H, back over the +L line conductor from line circuit 107, the bank contact engaged by wiper 486, the +L talking conductor of connector 400, contacts 493 and contacts 454 to ground.

After reasonable length of time, called subscriber H answers the call by removing his receiver to disconnect his ringer (both not shown) and complete his loop circuit for causing ring-cut-off relay 450 to operate in a well-known manner. In actuating its contacts, relay 450 completes its own obvious locking circuit by way of its lower winding and X contacts 457 to ground at contacts 432, opens the previously traced ringing circuit at contacts 451 and 454, simultaneously completes both the extension of the talking circuits and battery feed circuits at contacts 452 and 455 for the called subscriber H by way of the battery and ground-connected windings of the combined busy and battery feed relay 470, removes ring back tone at contacts 453 and opens a further point at contacts 456 in the busy tone circuit. Conversation may now take place over the established connection between subscribers G and H, with line relay 420 supplying talking battery for subscriber G and the combined battery feed and busy relay 470 supplying talking battery for subscriber H.

At the end of conversation and responsive to the replacing of their receivers by subscribers G and H, the equipment is restored to normal in the well-known manner and conditioned to handle future calls.

*Sub exchange call—Restricted local subscriber G to attendant's cabinet 122*

In the following operational description of the above-named type of call, it will be appreciated that the calling subscriber G desires to place a call to the attendant's cabinet 122.

Referring in particular to Figs. 1 and 4, it will be noted that the attendant's trunks such as 121 are connected to bank contacts in only the ninth level of connector 400, thereby making it necessary to dial the digit 9 as the first digit, when calling an attendant's trunk, or cabinet.

When subscriber G initiates the extension of a call to the attendant's cabinet 122 responsive to the removal of his receiver, the connection is extended into connector 400 in the same manner as described in the preceding section, with the same relays operating and the same operations taking place. Connector 400 operates responsive to the dialling of the first digit 9 in the same manner as previously described when the first digit of the call number of subscriber G was dialled. However, in the present case it will be noted that at the end of dialling the first digit 9, the connector wipers have been raised to the ninth level and are standing opposite the bank contacts in that level. At this stage of the operation, it will be noted that relays 420, 430 and 440 are operated and vertical magnet 401 has just restored. Due to the fact that the connector wipers are raised to the ninth level, normal post springs (NPS) 425 and 426 are closed.

The closing of NPS 425 are ineffective other than to prepare a point in the future energizing circuit of the stop relay 405. The closing of NPS 426 completes an obvious circuit for operating control relay 460. In actuating its contacts, relay 460 opens a point at contacts 461 in the circuit to the local switching relay 490, prepares a point at contacts 462 in the circuit for relay 405, opens a point at contacts 463 in the rotary pulsing circuit to rotary magnet 402, opens a point at contacts 464 in the rotary pulse operating circuit for relay 480, prepares a point at contacts 465 in the rotary stepping circuit for rotary magnet 402 and prepares another point at contacts 466 in the circuit for relay 405.

At this point in the operational description, slow-to-release relay 440 restores, whereby dial tone is removed at contacts 441 and the automatic rotary stepping circuit is completed to rotary magnet 402 at contacts 444. This automatic rotary stepping circuit may be traced as extending from ground, contacts 435, 407, 418, 444, 465, VON springs 476, cam springs 447, interrupter contacts 403 and through the winding of rotary magnet 402 to battery.

In operating, rotary magnet 402 interrupts its own circuit at contacts 403 and also advances connector wipers 485 through 487 one rotary step in the ninth level. In restoring, rotary magnet 402 closes its interrupter contacts 403 to complete its reoperating circuit, whereby the magnet causes the connector wipers to be advanced a second rotary step. This interaction between rotary magnet 402 and its interrupter contacts 403 continues until C wiper 487 encounters a battery potential (an indication of an idle attendant's trunk) on one of the connector bank contacts. If, however, no battery potential is encountered by C wiper 487, rotary magnet 402 will continue to rotate the connector wipers until they are rotated off the tenth, or last, contact. At this time cam springs 447 are operated to open the automatic rotary stepping circuit and thus prevent further operation of rotary magnet 402. Also, cam springs 445 and 446 operate to respectively close and open, thereby completing the application of busy tone to the calling line as an indication of an all-trunks-busy condition.

For the present description it is assumed that attendant's trunk circuit 121 is not busy. Therefore when C wiper 487 engages the bank contact terminating the C conductor from trunk 121 and encounters the battery potential impressed thereon, a circuit is completed for operating the stop relay 405. This circuit may be traced as extending from ground, NPS 425, contacts 465, 436, winding of relay 405, contacts 462, C wiper 487 and engaged bank contact and the C conductor of trunk 121 to battery.

In actuating its contacts, stop relay 405 completes an obvious circuit at contacts 406 for operating selective switching relay 410 and opens a further point at contacts 407 in the automatic rotary stepping circuit.

In actuating its contacts, switching relay 410 opens the circuit at contacts 411 and 413 for line relay 420, completes the circuit at contacts 412 and 414 for extending the connection of the talking conductors, or line, into the attendant's trunk circuit 121, completes a circuit at contacts 415 for connecting a ground (not shown) from the finder 113 to the C conductor of connector 400 to shunt relay 405 and to busy trunk circuit 121 at the connector terminals, connects this ground at contacts 416 for completing an obvious locking circuit for itself, removes ground at contacts 417 to open the circuit to relay 430 and to prevent release magnet 404 from operating during the present time and opens a further point at contacts 418 in the automatic rotary stepping circuit. Relays 420, 405 and 430 subsequently restore with no effect on the present connection. The relays remaining operated in connector 400 during the remainder of the call are selective switching relay 410 and control relay 460.

The attendant at attendant's cabinet 122 is signalled in a well-known manner and handles the call from subscriber G also in a well-known manner.

At the end of conversation, the equipment is restored to normal in a well-known manner and conditioned to handle future calls.

Before continuing to the next operational description, it will be noted that the previously described local call and the call to the attendant's cabinet are the only two types of calls that subscriber G can initiate and complete, with the reasons being described later on as to why he can not call a main exchange subscriber.

*Inter exchange call—PABX non-restricted local subscriber F to MAX local subscriber C*

In the following operational description of the above-named type of call, it will be appreciated that non-restricted local subscriber F in the PABX desires to place a call to subscriber C in the MAX.

Referring to Fig. 1, it will be noted that the path for this type of call may be traced as extending from subscriber F, line circuit 104, lead 75 to finder 113 by means of distributor 111, connector 400 (Fig. 4), lead 79 to repeater 115, lead 78 to incoming selector 117, leads 72 and 73 to connector 200 (Fig. 2), lead 65 to line circuit 101 and to subscriber C. It will also be noted that the EC conductor in line circuit 105 of non-restricted subscriber F is connected to ground. Further, it will be noted that all repeaters such as 115 leading to the main exchange are connected to contacts in only the tenth level of connector 400, thereby making it necessary to dial the digit 0 as the first digit when calling the main exchange.

Reference will now be had in particular to Figs. 1, 2 and 4 during the ensuing description of the present type of call. When subscriber F initiates the extension of a call to local subscriber C in the main exchange responsive to the removal of his receiver, the connection is extended into connector 400 in the same manner and with the same operations taking place as described in the preceding section covering a call from subscriber G to subscriber H in the sub exchange. Connector 400 thus operates responsive to the dialling of the first digit 0 also in the same manner as previously described. In the present description, it will be noted that at the end of dialling of the first digit 0, the connector wipers have been raised to the tenth level and are standing opposite the bank contacts in that level. At this stage of the operation, it will be seen that relays 420, 430 and 440 are operated and vertical magnet 401 has just restored. Due to the fact that the connector wipers are raised to the tenth level, NPS 426 are the only normal post springs that are closed, thereby completing a previously traced circuit for operating control relay 460. However, since subscriber F is a non-restrictive subscriber, the ground potential applied to the EC conductor in line circuit 104 is forwarded to the EC conductor of connector 400 and will serve the same purpose for the present type of call as NPS 425 served in the call from subscriber G to the attendant's cabinet 122.

The operations of connector 400, comprising the operation of relay 460, the restoring of relay 440 and the automatic rotary stepping and hunting, is the same as that described in the above-mentioned type of call. In the present type of call, connector 400 is searching for an idle repeater such as 115 instead of an attendant's trunk. Busy tone is returned to calling subscriber F, if the connector hunts and steps through the entire tenth level and thereafter rotates its wipers off the bank after failing to find an idle repeater, also in the same manner as previously described.

If it is assumed that repeater 115 is idle, a circuit very similar to the one previously traced is completed for operating the stop relay 405 responsive to C wiper 487 encountering battery potential on the bank contact terminating the C conductor of repeater 115, with the exception that the potential for this circuit is furnished over the combined EC conductors from line circuit 104 instead of NPS 425. Connector 400 now operates to switch the extension of the connection through to repeater 115 in the same manner also as previously described.

At this stage in the description it is thought advisable to point out that incoming selector 117 and first selector 116 are similar in construction and operation and that the contact banks of these two selectors are multipled. The first digit of the call number of MAX subscriber C is dialled by PABX subscriber F with repeater 115 operating in a well-known manner to repeat the dial pulses to selector 117. Selector 117 is a selector of the battery searching type and operates responsive to receipt of these repeated pulses to consequently search for and connect with the first idle connector, which in the present description is assumed to be the one disclosed in detail in Fig. 2 and represented as connector 200.

Subsequent to seizure of connector 200 subscriber F thereafter dials the remaining two digits 65, with connector 200 operating to extend the connection to subscriber C in the same manner as described in the section covering a MAX call from subscriber A to subscriber C.

Conversation between calling subscriber F and called subscriber C may now take place. At the end of conversation and responsive to both parties replacing their receivers, the equipment associated with this type of call is restored to normal in a well-known manner and conditioned to handle future calls.

It is thought advisable to point out at this time that PABX subscriber F may initiate the extension of calls to other MAX subscribers or to the PBX such as 120, in the same manner as just described and with these calls being handled in the MAX in the same manner as described in the sections covering the various types of MAX calls.

*Inter exchange call—MAX local subscriber A to PABX local subscriber H*

In the following operational description of the above-named type of call, it will be appreciated that local subscriber A in the MAX desires to place a call to local subscriber H in the PABX.

Referring to Fig. 1, it will be noted that the path for this type of call may be traced as extending from subscriber A, line circuit 100, finder 112 by means of distributor 110, first selector 116, lead 73 to connector 200 (Fig. 2), lead 20 to repeater 114, lead 74 to incoming line circuit 106, lead 77 to finder 113 by means of distributor 111, connector 400 (Fig. 4) lead 81 to line circuit 107 and to subscriber H. It will be noted that upon observing the contact bank layout (Fig. 1) of connector 200, that in order to extend the connection to repeater 114 the digits 20 must be dialled.

The initiation of the call by subscriber A, the extension of the call into connector 200 responsive to dialling the first digit and the consequent operations thereof responsive to the dialling of the second and third digits 20 are all similarly described in the section covering a MAX call from subscriber A to subscriber C and it is thought unnecessary to repeat them in this section. Therefore, at the end of dialling the third digit 0 and assuming that repeater 114 is idle, it will be seen that the connection is extended into repeater 114 and hence to the incoming line circuit 106 by way of lead 74. Finder 113, under control of distributor 111, is thereafter operated to seize and connect with line circuit 106. The remaining two, or the fourth and fifth, digits corresponding to subscriber H are now dialled, with connector 400 operating to extend and complete the connection from subscriber A to subscriber H in the manner similarly described in the section covering a PABX call from subscriber G to subscriber H.

Conversation between calling MAX subscriber A and called PABX subscriber H may now take place. At the end of conversation and responsive to both parties replacing their receivers, the equipment associated with this type of call is restored to normal in a well-known manner and conditioned to handle future calls.

It is thought sufficient to mention that in addition to local calls to the PABX, subscriber A may also place a call to the attendant's cabinet 122. This call is handled in the same manner as just described and in the sub exchange section covering a call from subscriber G to attendant's cabinet 122.

It is thought necessary to point out that the PABX restrictive subscriber G is prevented from extending a call to the MAX for the reason that no ground potential is impressed on the EC conductor in his line circuit 105. Hence, with the wipers and connector 400 being raised to the tenth level and NPS 425 not being closed, there is no ground on the connector EC conductor to complete the circuit for operating stop relay 405, even though the connector wipers may engage an idle repeater such as 115. Thus the connector wipers will rotate off the bank in the same manner as previously described and cause busy tone to be returned to subscriber G.

Having described my invention, and what is considered new and desired to have protected by Letters Patent will be pointed out in the appended claims.

What is claimed is:

1. In a telephone system, a main exchange, a sub exchange, subscriber lines in both said exchanges, main exchange switching means operated responsive to the initiation of a call by calling one of said main exchange subscriber lines for connecting therewith, a first connector switch in said main exchange, means for operating said main exchange switching means to seize said first connector switch, a line circuit in said main exchange individual to a particular one of said main exchange subscriber lines, an individual primary access path connected to said line circuit, an individual secondary access path normally disconnected from said line circuit, means for directively operating said first connector switch under control of the said calling main exchange subscriber line to extend a talking connection to said particular subscriber line over said primary access path, means in said first connector switch for guarding said particular subscriber line against intrusion by busying said primary access path, a main exchange incoming selector switch, sub exchange switching means operated responsive to the initiation of a call by a calling one of said sub exchange subscriber lines for connecting therewith, a repeater trunk in said sub exchange connected to said incoming selector switch in said main exchange, a second connector switch in said main exchange, means for operating said sub exchange switching means to seize said repeater and extend the said connection from said calling sub exchange subscriber line to said incoming selector switch, means for operating said incoming selector switch by way of said sub exchange switching means and said repeater trunk to seize said second connector switch, means controlled by said calling sub exchange subscriber line by way of said sub exchange switching means, said repeater trunk, and said incoming selector for directively operating said second connector switch into testing relation with said particular subscriber line over said primary access path, means in said second connector switch operated responsive to said particular subscriber line testing busy over said primary access path for operating said second connector switch to connect with said secondary access path, a source of signalling current in said line circuit, and means in said line circuit operated responsive to said last-mentioned connection for applying said signalling current to said particular subscriber line.

2. In a telephone system, subscriber lines, a line circuit individual to a particular one of said subscriber lines, an individual normal access path normally connected to said line circuit, an individual auxiliary access path normally disconnected from said line circuit, first switching means comprising a first final connector switch directively operated under control of a calling one of said subscriber lines for extending a connection to said particular subscriber line over said normally connected access path, means in said first final connector switch for guarding said particular subscriber line against intrusion by busying said normally connected access path, second switching means comprising a second final connector switch directively operated under control of a calling one of said subscriber lines into testing relation with said particular subscriber line over said normally connected access path, means in said second final connector switch operated responsive to said particular subscriber line testing busy over said normally connected access path for operating said second connector switch to connect with said auxiliary access path, a source of signalling current in said line circuit, and means in said line circuit operated responsive to said last-mentioned connection for applying said signalling current to said particular subscriber line.

3. In a telephone system, subscriber lines, a final connector switch, a line circuit individual to a particular one of said subscriber lines, a pair of trunk lines individual to said line circuit accessible to said final connector switch, first switching means having access to said final connector switch, repeater trunks connected to said first switching means, other switching means comprising a second connector switch operated under control of a calling one of said subscriber lines for selectively connecting with a first idle one of said repeater trunks to extend a connection to said first switching means, means responsive to the initiation of a call by said particular subscriber line for guarding said particular subscriber line against intrusion by said final connector switch by busying one of said pair of trunk lines, means in said final connector switch for directively operating said final connector switch under control of said calling subscriber line into testing relation with said particular subscriber line over said one trunk line, means in said final connector switch operated responsive to said particular subscriber line testing busy over said one trunk line for operating said final connector switch to connect with the other trunk line of said pair, a source of signalling current in said line circuit, and means in said line circuit operated responsive to said last-mentioned connection with said other trunk line for applying said signalling current to said particular subscriber line.

4. In a telephone system such as claimed in claim 3, in which said final connector switch includes switch-through means, means including testing means in said final connector operated responsive to said particular subscriber line testing busy over said one trunk line for rendering said switch-through means ineffective, control means in said final connector, means including means operated responsive to said testing means for operating said control means, auxiliary testing means including stopping means in said final connector rendered effective by said control means for testing subsequent connections of said final connector, operating means including means rendered effective by said control means for operating said final connector to connect with said other trunk line, means for operating said stopping means in case said other trunk line tests idle, and means operated by said stopping means for disabling said operating means to stop further operation of said final connector.

5. In a telephone system such as claimed in claim 3, in which said second connector switch includes switch-through means, means for busying the first one of said repeater trunks, means including testing means in said second connector switch operated responsive to the said first repeater trunk testing busy for rendering said switch-through means ineffective, control means in said second connector switch, means including means operated responsive to the operation of said testing means for operating said control means, auxiliary testing means including stopping means in said second connector switch rendered effective by said control means for testing subsequent connections of said second connector switch, operating means including means rendered effective by said control means for operating said second connector switch to connect with the next successive one of said repeater trunks, means for operating said stopping means in case the said next repeater trunk tests idle, and means operated by said stopping means for disabling said operating means to stop further operation of said second connector switch.

6. In a telephone system, a plurality of calling lines, a called line, a station on each of said calling lines and a station on said called line, a line circuit individual to said called line, an individual normal access path normally connected to said line circuit, an individual auxiliary access path normally disconnected from said line circuit, a first automatic switch, means controlled by the said station on one of said calling lines for directively operating said switch to extend a connection to said called line by connecting with said normal access path, means in said switch for thereafter guarding said called line against intrusion by busying said normal access path, a second automatic switch, means controlled by the said station on a second one of said calling lines for directively operating said second switch into testing relation with said called line by connecting with said normal access path, means in said second switch operated responsive to said called line testing busy over said normal access path for advancing said second switch to connect with said auxiliary access path, a source of signalling current in said line circuit, and means in said line circuit operated responsive to said connection with said auxiliary path for applying said signalling current to said called line to signal said station thereon.

7. In a telephone system such as claimed in claim 6, including a meter in said line circuit, a circuit for operating said meter, means in said line circuit operated responsive to said first switch connecting with said normal access path for preparing a point in said operating circuit for said meter, and means in said line circuit operated subsequent to said last-mentioned connection in response to said operation of said last-mentioned means for completing said circuit to said meter to operate said meter to register the number of times that said signalling current is applied to the said called line.

8. In a telephone system such as claimed in claim 6, including means in said second switch operated responsive to said connection with said auxiliary path for busying said auxiliary access path, a third automatic switch, means controlled by the said station on a third one of said calling lines for directively operating said third switch into testing relation with said called line by connecting with said normal access path, means in said third switch operated responsive to said called line testing busy over said normal access path for operating said third switch to connect in testing relation with said auxiliary access path, and said last-mentioned means in said third switch responsive to said auxiliary access path testing busy for reoperating said third switch to disconnect from said auxiliary access path.

9. In a telephone system such as claimed in claim 8, including a source of signalling current in said third switch, and means in said third switch operated responsive to the said disconnection of said third switch from said auxiliary access path for applying said signalling current to said third calling line to signal the said station thereon that both said access paths have tested busy.

10. In a telephone system, a calling line, a busy called line, a station on said calling line and a station on said called line, a line circuit individual to said called line, an individual primary access path normally connected to said line circuit, an individual secondary access path normally disconnected from said line circuit, an automatic switch for completing extensions between calling and said called line, means controlled by said station on said calling line for directively operating said switch into testing relation with said called line over said primary access path, means for guarding said called line against intrusion by said switch by busying said primary access path, means in said switch operated responsive to said called line testing busy over said primary access path for operating said switch to connect with said secondary access path of said line circuit, a source of signalling current in said line circuit, and means in said line circuit operated responsive to said connection over said secondary access path for applying said signalling current to said called line to signal said station thereon.

11. In a telephone system such as claimed in claim 10, including a source of signalling current in said automatic switch, means in said switch operated responsive to said switch connecting with said secondary access path of said line circuit for applying said last-mentioned signalling current to said calling line to signal said station thereon for the duration of said connection with said second access path, and means included in said last-mentioned means for busying said secondary access path.

12. In a telephone system such as claimed in claim 10, including control means in said line circuit operated responsive to said station on said called line terminating the said guarding of said primary access path, by restoring said busy called line to an idle condition, for connecting said secondary access path to said called line, and means in said control means for thereafter busying said primary access path.

13. In a telephone system such as claimed in claim 12, including a source of ringing current in said switch, a circuit completed responsive to said connection of said secondary access path to said called line by said control means for applying said ringing current to signal said station on said called line over said secondary access path, and means in said switch operated responsive to said station on said called line answering the said ringing signal for completing a talking connection between said calling and called lines.

14. In a telephone system, a subscriber line, a line circuit individual to said subscriber line, a pair of trunk lines individual to said line circuit, a plurality of automatic directively controllable switches, means for operating one of said switches to connect with said subscriber line over one of said pair of trunk lines, means in said one switch operated responsive to said connection for guarding said subscriber line against intrusion by busying said one trunk line, means for operating another one of said switches to engage said one trunk line, means in said other switch operated responsive to said one trunk line testing busy for advancing said other switch to connect with said other trunk line of said pair, a source of signalling current in said line circuit, and means in said line circuit operated responsive to said last-mentioned connection for applying said signalling current to said subscriber line.

15. In a telephone system, a called subscriber line, a plurality of connectors each having a first and a second access path to said line, means for operating a first one of said connectors to connect with said line over said first access path in case said called line is idle and for marking said first access path busy, means for operating a second one of said connectors to test the busy condition of said called line over said first access path, means in said second connector operated responsive to said second connector encountering said busy marked first access path for advancing said second connector to said second access path and for marking said second access path busy, automatic means controlled over said second access path in response to said second connector advancing to said second access path for notifying the subscriber on said called line that another connection with said called line is desired, means for enabling said second connector to camp on said second access path and for preventing the completion of the connection to said called line while said called line is busy, and means for establishing said connection over said second connector and said second access path to said called line in response to said first connector removing said busy marking from said first access path when said called line becomes idle.

16. In a telephone system, a called subscriber line, a connector switch, a first set of connector terminals normally connected to said called subscriber line, a second set of connector terminals normally disconnected from said called subscriber line, means for directively operating said connector into a testing relation with said first set of terminals, means for reoperating said connector switch into a testing relation with said second set of terminals in case said called line tests busy over said first set, means controlled over said second set of terminals for notifying said called subscriber while busy that another connection with his line is desired, and means for completing said other connection over said second set of terminals responsive to the expiration of said busy condition on said first set of terminals.

References Cited in the file of this patent

UNITED STATES PATENTS

| | | |
|---|---|---|
| 2,268,984 | Hersey | Jan. 6, 1942 |
| 2,497,782 | Lomax | Feb. 14, 1950 |